United States Patent Office 3,342,517
Patented Sept. 19, 1967

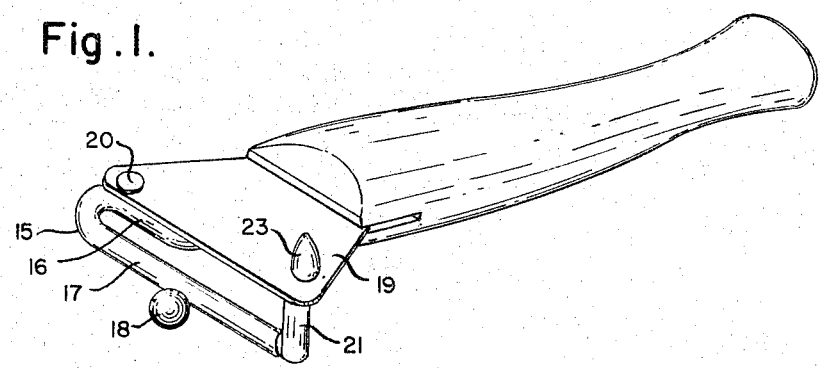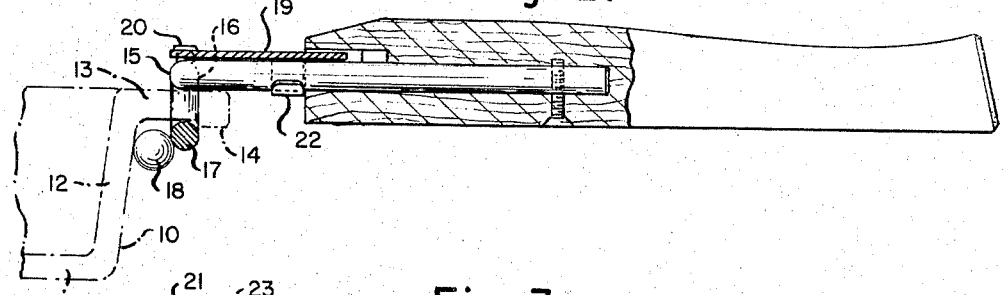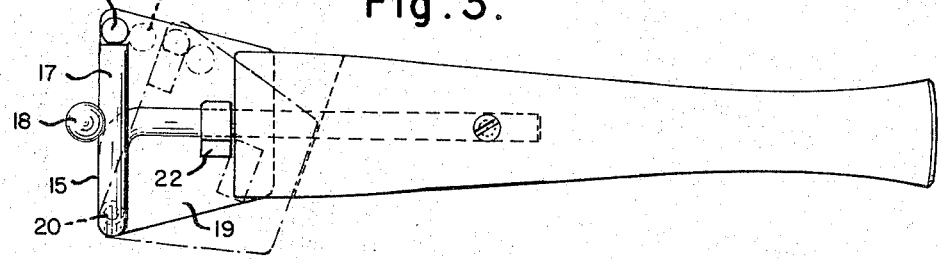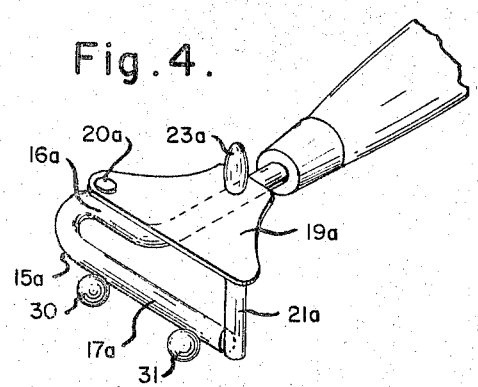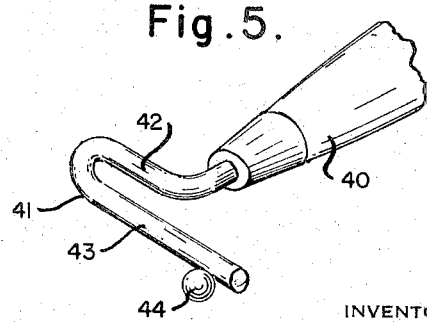
INVENTOR
Vaughn K. Pryce

3,342,517
DETACHABLE HANDLES
Vaughn K. Pryce, 417 4th St., Derry, Pa. 15627
Filed Jan. 18, 1965, Ser. No. 426,347
4 Claims. (Cl. 294—16)

This invention relates to detachable handles and particularly to a handle adapted to be removably applied to a fry pan, casserole or like cooking vessel having one or more outwardly extending lugs or lips. There are on the market a variety of glass and ceramic cooking vessels which have a flat bottom and an upwardly extending flange defining the body of the vessel which flange has on its upper edge at least one outwardly extending lug or lip. Such cooking vessels are made and sold by Corning, Anchor Hocking and Owens-Illinois glass companies.

It is essential in a detachable handle for the service here contemplated, that the handle engage the lug or lip without scoring or otherwise damaging the glass or ceramic surface or otherwise setting up strains. It is also essential that the handle hold the vessel sufficiently tightly to permit its removal from a source of heat or placement in or on a source of heat without loss of engagement.

I have invented a detachable handle which when once connected to the cooking vessel cannot be accidentally disconnected or removed. The handle of my invention will not score or otherwise injure the glass surface of the lug or lip. The handle may be very simply and quickly attached and removed from the cooking vessel, is simple and inexpensive in construction and attractive and functional in appearance.

In a preferred embodiment of my invention I provide a detachable handle of the character described comprising a hand gripping portion, a fixed gripping jaw integral with the hand gripping portion, said fixed jaw being in the form of a U-shaped member adapted to slide over a lug of a cooking vessel between the body of the vessel and a depending lip on the lug remote from the vessel body, and spacing means on the jaw abutting the vessel body beneath the lug to stabilize the jaw against rotation on the lug. Preferably, locking means are provided pivoted on the jaw to effectively close the U-shaped member to prevent removal from the lug. Finger engaging means are provided on the locking means for moving it into and out of locking position.

In the foregoing general description I have set out certain objects, advantages and purposes of my invention. Other objects, advantages and purposes of my invention will be apparent from a consideration of the following description and the accompanying drawings in which FIGURE 1 is an isometric view of a preferred embodiment of a detachable handle according to my invention;

FIGURE 2 is a side elevational view partly in section of the handle of FIGURE 1 showing the handle in locking engagement with a cooking vessel;

FIGURE 3 is a bottom view of the handle of FIGURE 2 showing the locking means in closed position in solid lines and in open position in chain lines;

FIGURE 4 is a second embodiment of my invention; and

FIGURE 5 is a third embodiment of my invention.

Referring to the drawings I have illustrated a conventional ceramic fry pan 10 having a bottom 11 and an upstanding flange 12 defining the fry pan. An integral lug 13 extends from the upper edge of the flange 12 generally parallel to the bottom 11 of the pan. The lug 13 is provided with a depending lip 14 at its outermost extremity.

The detachable handle of my invention is provided with a U-shaped fixed jaw 15 having spaced generally parallel legs 16 and 17 spaced apart a distance slightly greater than the thickness of lug 13. The lower leg 17 is elongated to extend substantially completely beneath the width of lug 13 and is provided with a spacer 18 adapted to bear against flange 12 beneath lug 13. A locking member 19 is pivoted on pin 20 on leg 16 of the fixed jaw and is provided with a depending stop 21 which in the closed position (solid lines of FIGURE 3) bears against lug 13 and closes the U-shaped jaw to prevent removal of the lug therefrom and in the open position (chain line in FIGURE 3) permits the fixed jaw 15 to be slide sidewise from the lug 13.

The operation of the handle of FIGURES 1–3 is as follows: In order to attach the handle to fry pan 10, the fixed jaw 15 with locking member 19 in open position is slid sidewise over lug 13 with leg 16 above the lug 13 and the leg 17 beneath lug 13 between flange 12 and lip 14 on lug 13 with spacer member 18 bearing against flange 12. The locking member is moved to the locked position with depending stop 21 in alignment with the legs of the fixed jaw 15 to hold the lug 13 within jaw 15. Spring catch 22 holds the locking member in both open and closed positions while the locking member is moved by finger piece 23.

In FIGURE 4 I have illustrated a second embodiment in which parts identical with those in FIGURES 1 and 2 bear like numbers with the suffix $a$ added. This embodiment differs from that of FIGURES 1–3 in providing two spaced spacer members 30 and 31 on the leg 17$a$, both adapted to bear against the flange 12. In addition the finger piece 23$a$ is differently placed. The operation of the device of FIGURE 4 is identical with that of the embodiment of FIGURES 1–3.

In FIGURE 5 I have illustrated an embodiment of my invention which is made up of a hand gripping portion 40 having a U-shaped fixed jaw 41 made up of upper and lower legs 42 and 43. The lower leg is provided with spacer member 44 identical with spacer member 18 of FIGURES 1–3. The handle is used by sliding the fixed jaw 41 onto lug 13 with the leg 42 above and leg 43 below the lug and between the depending lip 14 and flange 12 of the pan. The spacer member 44 bears against flange 12 to restrict turning motion of the handle about lug 13. This handle may be used only to move a cooking vessel between horizontal positions; it cannot be used to move the vessel in any position.

In the foregoing specification I have set out certain preferred embodiments of my invention. It will be understood, however, that this invention may be otherwise embodied within the scope of the following claims.

I claim:

1. A detachable handle for use on cooking vessels having an outstanding horizontal lug on the vessel sidewall and a depending lip on the lug remote from the vessel comprising an elongated hand gripping portion, a fixed gripping jaw fixed in said hand gripping portion, said fixed jaw being in the form of U-shaped wire member bent in a plane transverse to the length of the hand gripping portion and adapted to slide parallel to the plane of the lug over the lug of a cooking vessel to engage the top and bottom of the lug between the vessel and the depending lip with the side of the lug in the bottom of the U-shaped member, and spacing means on the jaw beneath the lug abutting the vessel body.

2. A detachable handle for use on cooking vessels having an outstanding horizontal lug on the vessel sidewall and a depending lip on the lug remote from the vessel comprising a hand gripping portion, a fixed gripping jaw fixed in said hand gripping portion, said fixed jaw being in the form of a U-shaped member adapted to slide parallel to the plane of the lug over the lug of a cooking vessel to engage the top and bottom of the lug between the vessel and the depending lip, spacing means on the jaw beneath the lug abutting the vessel body and locking means pivoted on said jaw selectively to open and close said jaw.

3. A detachable handle for use on cooking vessels having an outstanding horizontal lug on the vessel sidewall and a depending lip on the lug remote from the vessel comprising a hand gripping portion, a fixed gripping jaw fixed in said hand gripping portion, said fixed jaw being in the form of a U-shaped member adapted to slide parallel to the plane of the lug over the lug of a cooking vessel to engage the top and bottom of the lug between the vessel and the depending lip, spacing means on the jaw beneath the lug abutting the vessel body, and locking means pivoted on said jaw selectively to open and close said jaw, said locking means including a depending pin member movable to close the opening in the U-shaped member and finger engaging means for moving said locking means into and out of locking position.

4. A detachable handle for use on cooking vessels having an outstanding horizontal lug on the vessel sidewall and a depending lip on the lug remote from the vessel comprising a hand gripping portion, a fixed gripping jaw fixed in said hand gripping portion, said fixed jaw being in the form of a U-shaped member adapted to slide parallel to the plane of the lug over the lug of a cooking vessel to engage the top and bottom of the lug between the vessel and the depending lip, spacing means on the jaw beneath the lug abutting the vessel body and locking means pivoted on said jaw selectively to open and close said jaw, said locking means including friction means holding said locking means in the open and in the closed positions.

References Cited

UNITED STATES PATENTS

| | | | |
|---|---|---|---|
| 584,133 | 6/1897 | McIntire | 294—26 |
| 602,324 | 4/1898 | Hautsch. | |
| 615,355 | 12/1898 | Green. | |
| 1,254,551 | 1/1918 | Tucker | 294—27 |
| 1,337,540 | 4/1920 | Burlingame | 294—27 |
| 1,563,575 | 12/1925 | Jung | 294—27 |
| 1,834,503 | 12/1931 | Smith | 294—31 |
| 1,867,571 | 7/1932 | Jelinek | 294—27 |
| 3,065,018 | 11/1962 | Serio | 294—31 |
| 3,297,349 | 1/1967 | Pryce | 294—27 X |

FOREIGN PATENTS

| | | |
|---|---|---|
| 80,976 | 11/1952 | Sweden. |

M. HENSON WOOD, Jr., *Primary Examiner.*

EVON C. BLUNK, *Examiner.*

J. N. ERLICH, C. H. SPADERNA,
*Assistant Examiners.*